(12) United States Patent
Morgan et al.

(10) Patent No.: US 7,161,556 B2
(45) Date of Patent: Jan. 9, 2007

(54) SYSTEMS AND METHODS FOR PROGRAMMING ILLUMINATION DEVICES

(75) Inventors: Frederick Morgan, Quincy, MA (US); Alfred Ducharme, Tewksbury, MA (US); Brian Chemel, Salem, MA (US); Ihor A. Lys, Boston, MA (US)

(73) Assignee: Color Kinetics Incorporated, Boston, MA (US)

( * ) Notice: Subject to any disclaimer, the term of this patent is extended or adjusted under 35 U.S.C. 154(b) by 447 days.

(21) Appl. No.: 10/078,221

(22) Filed: Feb. 19, 2002

(65) Prior Publication Data

US 2002/0145394 A1 Oct. 10, 2002

Related U.S. Application Data

(63) Continuation-in-part of application No. 09/924,119, filed on Aug. 7, 2001, now abandoned.

(60) Provisional application No. 60/270,441, filed on Feb. 21, 2001, provisional application No. 60/223,491, filed on Aug. 7, 2000.

(51) Int. Cl.
G09G 5/00 (2006.01)
(52) U.S. Cl. .................... 345/1.1; 340/825.52
(58) Field of Classification Search ........ 315/291, 315/307, 312, 292, 200 R; 340/815.45, 309.16, 340/825.52; 345/1.1; 362/800
See application file for complete search history.

(56) References Cited

U.S. PATENT DOCUMENTS

| 4,523,128 | A | 6/1985 | Stamm et al. |
|---|---|---|---|
| 4,529,980 | A | 7/1985 | Liotine et al. |
| 5,059,871 | A | 10/1991 | Pearlman et al. |
| 5,245,705 | A | 9/1993 | Swaney |
| 5,352,957 | A | 10/1994 | Werner |
| 5,420,572 | A | 5/1995 | Dolin, Jr. et al. |
| 5,455,464 | A | 10/1995 | Gosling |
| 5,499,510 | A | 3/1996 | Yoshida et al. |
| 5,603,225 | A | 2/1997 | Tobi et al. |
| 5,621,282 | A | 4/1997 | Haskell |
| 5,630,324 | A | 5/1997 | Yoshida et al. |
| 5,640,061 | A | 6/1997 | Bornhorst et al. |
| 5,752,766 | A * | 5/1998 | Bailey et al. ............... 362/250 |
| 5,866,992 | A | 2/1999 | Geiginger et al. |
| 5,903,373 | A | 5/1999 | Welch et al. |
| 5,929,770 | A | 7/1999 | Faita |
| 6,150,774 | A * | 11/2000 | Mueller et al. ............. 315/291 |
| 6,175,201 | B1 | 1/2001 | Sid |
| 6,252,368 | B1 | 6/2001 | Sugie |
| 6,281,880 | B1 | 8/2001 | Rose et al. |

(Continued)

FOREIGN PATENT DOCUMENTS

EP 0652689 A 5/1995

(Continued)

OTHER PUBLICATIONS

International Search Report from PCT Application PCT/US01/41583.

*Primary Examiner*—Amr A. Awad
*Assistant Examiner*—Tom Sheng
(74) *Attorney, Agent, or Firm*—Wolf, Greenfield & Sacks, PC

(57) ABSTRACT lighting system. In one example, a user interface is coupled to a programming device that is adapted to provide one or more selected addresses to a programmable lighting system, based on user input via the user interface. The system is also adapted to store the one or more selected addresses in memory.

72 Claims, 3 Drawing Sheets

U.S. PATENT DOCUMENTS

| | | |
|---|---|---|
| 6,362,578 B1 * | 3/2002 | Swanson et al. ............ 315/307 |
| 6,424,660 B1 | 7/2002 | Jacobson, Jr. |
| 6,528,954 B1 | 3/2003 | Lys et al. |
| 6,548,967 B1 | 4/2003 | Dowling et al. |
| 6,577,080 B1 | 6/2003 | Lys et al. |
| 6,585,395 B1 * | 7/2003 | Luk ............................ 362/250 |
| 6,608,453 B1 | 8/2003 | Morgan et al. |
| 6,624,597 B1 | 9/2003 | Dowling et al. |
| 2001/0033488 A1 | 10/2001 | Chliwnyj et al. |
| 2002/0038157 A1 | 3/2002 | Dowling et al. |
| 2002/0044066 A1 | 4/2002 | Dowling et al. |
| 2002/0047569 A1 | 4/2002 | Dowling et al. |
| 2002/0047624 A1 | 4/2002 | Stam et al. |
| 2002/0048169 A1 | 4/2002 | Dowling et al. |
| 2002/0057061 A1 | 5/2002 | Mueller et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0101197 A1 | 8/2002 | Lys et al. |
| 2002/0130627 A1 | 9/2002 | Dowling et al. |
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0153851 A1 | 10/2002 | Dowling et al. |
| 2002/0158583 A1 | 10/2002 | Lys et al. |
| 2002/0163316 A1 | 11/2002 | Dowling et al. |
| 2002/0171365 A1 | 11/2002 | Morgan et al. |
| 2002/0171377 A1 | 11/2002 | Mueller et al. |
| 2002/0171378 A1 | 11/2002 | Morgan et al. |
| 2002/0176259 A1 | 11/2002 | Ducharme |
| 2002/0195975 A1 | 12/2002 | Dowling et al. |
| 2003/0011538 A1 | 1/2003 | Lys et al. |
| 2003/0020333 A1 | 1/2003 | Ying |
| 2003/0028260 A1 | 2/2003 | Blackwell |
| 2003/0057884 A1 | 3/2003 | Dowling et al. |
| 2003/0057886 A1 | 3/2003 | Lys et al. |
| 2003/0057887 A1 | 3/2003 | Dowling et al. |
| 2003/0057890 A1 | 3/2003 | Lys et al. |
| 2003/0076281 A1 | 4/2003 | Morgan et al. |
| 2003/0100837 A1 | 5/2003 | Lys et al. |
| 2003/0133292 A1 | 7/2003 | Mueller et al. |
| 2003/0137258 A1 | 7/2003 | Peipgras et al. |
| 2003/0189412 A1 | 10/2003 | Cunningham |
| 2003/0222587 A1 | 12/2003 | Dowling et al. |

FOREIGN PATENT DOCUMENTS

| | | |
|---|---|---|
| EP | 0687718 A | 10/1995 |

* cited by examiner

SYSTEMS AND METHODS FOR PROGRAMMING ILLUMINATION DEVICES

CROSS REFERENCES TO RELATED APPLICATIONS

This application claims the benefit under 35 U.S.C. §119 (e) of U.S. Provisional Application Ser. No. 60/270,441, filed Feb. 21, 2001, entitled "Programming Device for Illumination Devices."

This application also claims the benefit under 35 U.S.C. §120 as a continuation-in-part (CIP) of U.S. Non-provisional application Serial No. 09/924,119, filed Aug. 7, 2001 now abandoned, entitled "Automatic Configuration Systems and Methods for Lighting and Other Applications."

This application also claims the benefit under 35 U.S.C. §120 of U.S. Provisional Application Ser. No. 60/223,491, filed Aug. 7, 2000, entitled "Automatic Configuration Systems and Methods for Lighting and Other Applications," as the above-identified Non-provisional application Ser. No. 09/924,119 is similarly entitled to the benefit of U.S. Provisional Application Ser. No. 60/223,491.

Each of the foregoing applications is hereby incorporated herein by reference.

FIELD OF THE INVENTION

The present invention relates generally to systems and methods for programming illumination systems. More particularly, various embodiments of the present invention relate to systems and methods for programming one or more addresses for addressable lighting systems.

DESCRIPTION OF RELATED ART

With the advent of digital lighting technologies, it is becoming increasingly popular to create lighting systems of light-emitting diode (LED) based lighting devices, as described for example in U.S. Pat. No. 6,016,038, U.S. Pat. No. 6,150,774 and U.S. Pat. No. 6,166,496, each of which is incorporated herein by reference. Numerous lighting effects can be created with such systems, and one or more LED based lighting devices can be interconnected and coordinated, through a network for example, to execute the lighting effects (e.g., to create a rainbow chase down a hallway or corridor).

In one example of a lighting system, a data stream containing packets of information is communicated to multiple lighting devices. At least some of the multiple lighting devices may receive all of the packets of information, but a given lighting device receiving the packets may only respond to those packets that are addressed particularly to it. Once an appropriately addressed packet of information is received, the lighting device may read and execute the commands. This arrangement typically requires that at least some of the lighting devices have at least one address, and that these addresses need to be unique with respect to other lighting devices of the system.

In some conventional systems similar to the lighting system described above, addresses for lighting devices typically are specified or assigned by setting switches on each of the lighting devices during installation. This procedure of settings switches tends to be time consuming and error prone.

Lighting systems for theatres, entertainment, retail and architectural venues such as casinos, theme parks, stores, malls, etc., generally require elaborate lighting instrumentation and, in addition, some type of network infrastructure to control the lights. One significant task of a lighting system designer generally includes configuration of the system once all of the lighting devices are in place. In some conventional systems, this configuration process involves going to each instrument or lighting fixture and specifying or assigning the network address of each unit, through the use of switches or dials for example, and then determining the setup and corresponding element on a lighting board or computer. Two people usually accomplish this and, depending on the distance, use walkie-talkies and enter into a lot of back and forth discussion during the process. With sufficient planning and coordination this address selection and setting can be done a priori but still requires substantial time and effort This task can take many hours depending on the locations. For example, a new amusement park ride may use hundreds of lighting fixtures, each of which is controlled over a network and are neither line-of-sight to each other or to any single point. Each one must be identified and a correspondence made between the light and its setting on the lighting control board. Mix-ups and confusion are common during this process.

As discussed above, conventional networked lighting devices have their addresses set through a series of physical switches such as dials, dipswitches or buttons. Typically, these devices have to be individually set to particular addresses and this process can be cumbersome.

SUMMARY OF THE INVENTION

In various embodiments, methods and systems are provided for multicolored illumination and, more particularly, for programming illumination devices in lighting systems.

For example, one embodiment of the invention is directed to a method for assigning at least one address in a lighting system. The method of this embodiment comprises steps of selecting the at least one address via a user interface of a programming device, communicating the selected at least one address from the programming device to the lighting system, and storing the at least one selected address in memory in the lighting system.

Another embodiment of the invention is directed to a method for selecting an address in a system including a lighting system and a programming device. The programming device comprises a processor, a user interface associated with the processor adapted to receive user input, and a communication port associated with the processor and adapted to communicate with the lighting system. The method comprises steps of selecting an address on the programming device using the user interface, and communicating the selected address from the programming device through the communication port.

Another embodiment of the invention is directed to a method for setting at least one address of a lighting system. The lighting system comprises memory, a processor associated with the memory, and a communication port associated with the processor adapted to communicate with a remote programming device. The method comprises steps of receiving via the communication port at least one address from the remote programming device, and storing the received at least one address in the memory.

Another embodiment of the invention is directed to a system. The system comprises a lighting system including memory and a processor associated with the memory, a programming device comprising a second processor, and a user interface associated with the second processor and adapted to receive user input to select an address. The programming device is adapted to communicate the selected address to the lighting system. The lighting system is adapted to receive the address and store the address in the memory.

Another embodiment of the invention is directed to a programming device comprising a processor and a user interface associated with the processor and adapted to receive user input to select an address. The programming device is adapted to communicate the selected address from the programming device to a remote lighting system.

Another embodiment of the invention is directed to a lighting system, comprising memory and a processor associated with the memory; wherein the lighting system is adapted to receive an address from a remote programming device and to store the received address in the memory.

Another embodiment of the invention is directed to a method for selecting a mode of a lighting system. The method comprises a step of providing a lighting system wherein the lighting system comprises memory, a processor associated with the memory, and a communication port associated with the processor adapted to communicate with a programming device, wherein at least two lighting modes are stored in the memory. The method also comprises a step of providing a programming device wherein the programming device comprises a second processor, a user interface adapted to receive user input and communicate with the second processor, and a second communication port associated with the second processor adapted to communicate with the lighting system. The method further comprises steps of reading the at least two modes from the memory using the programming device, and having a user select at least one mode from the at least two modes using the user interface.

Another embodiment of the invention is directed to a method, in a system including a lighting system and a programming device, for selecting at least one lighting mode of the lighting system. The lighting system comprises memory, a processor associated with the memory, and a communication port associated with the processor adapted to communicate with the programming device, wherein at least two lighting modes are stored in the memory. The programming device comprises a second processor, a user interface adapted to receive user input and communicate with the second processor, a second memory and a second communication port associated with the second processor adapted to communicate with the lighting system. The method comprises steps of selecting a mode indicator on the programming device using the user interface, and communicating the selected mode indicator from the programming device to the lighting system.

Another embodiment of the invention is directed to a method, in a system including a lighting system and a programming device, for downloading at least one mode to the lighting system. The lighting system comprises memory, a processor associated with the memory, and a communication port associated with the processor adapted to communicate with the programming device. The programming device comprises a second processor, a user interface adapted to receive user input and communicate with the second processor, a second memory and a second communication port associated with the second processor adapted to communicate with the lighting system, wherein at least one mode is stored in the second memory. The method comprises steps of communicating the at least one mode from the programming device to the lighting system, and storing the at least one mode in the memory of the lighting system.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

DETAILED DESCRIPTION

Figure 1:
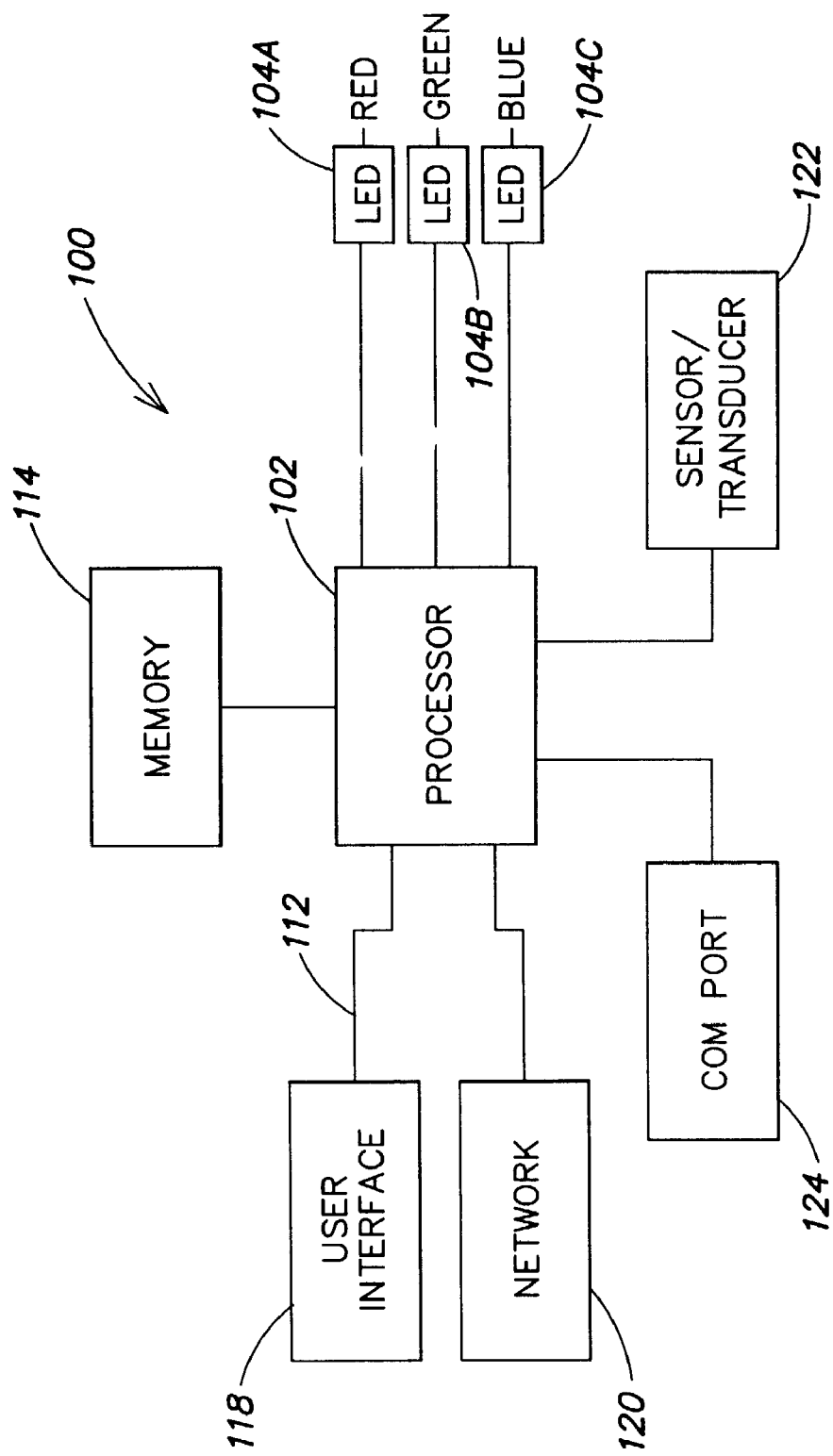
FIG. 1 is a lighting system according to one embodiment of the present invention.

The description below pertains to several illustrative embodiments of the invention. Although many variations of the invention may be envisioned by one skilled in the art, such variations and improvements are intended to fall within the compass of this disclosure. Thus, the scope of the invention is not to be limited in any way by the disclosure below.

A device according to one embodiment of the present invention may be used to set (e.g., specify, assign) the address of an illumination device. For example, many lighting installations have hundreds of LED based lighting devices and these lighting devices may be connected through a network. Lighting control information may be sent over the network and each of the lighting devices may be waiting for addressed instructions. The data may be in the form of a data stream where lighting control information is communicated to all of the lighting devices. The data stream may be broken up into packets where each packet includes an address. Another example of data format is when the position of the data within the data stream indicates its address (e.g. DMX protocol). When a lighting device receives a data packet that is addressed to it the lighting device may read and execute the instructions. This technique is taught in U.S. Pat. No. 6,016,038.

According to one embodiment of the invention, Applicants have recognized and appreciated that, rather than setting dip switches on every lighting device, it would be much easier and faster to attach a lighting device to a programming device and load an address into the lighting device from the programming device. This may take the form of generating an address at the programming device, and then sending the address to the lighting device.

LED based lighting systems may be preprogrammed with several lighting routines for use in a non-networked mode. For example, the switches on the lighting device may be set such that the lighting device produces a solid color, a program that slowly changes the color of the illumination throughout the visible spectrum over a few minutes, or a program designed to change the illumination characteristics quickly or even strobe the light. Generally, the switches used to set the address of the lighting system may also be used to set the system into a preprogrammed non-networked lighting control mode. Each lighting control programs may also have adjustable parameters that are adjusted by switch settings.

According to one embodiment of the present invention, one or more of these functions can also be set using a programming device according to the principles of the invention. For example, a user interface may be provided in the programming device to allow the selection of a program in the lighting system, adjust a parameter of a program in the lighting system, set a new program in the lighting system, or make another setting in the lighting system. By communicating to the lighting system through a programming device according to the principles of the invention, a program could be selected and an adjustable parameter could be set. The lighting device can then execute the program without the need of setting switches.

Applicants also have appreciated and recognized that another problem with setting switches for such a program selection is that the switches do not provide an intuitive user interface. The user may have to look to a table in a manual to find the particular switch setting for a particular program, whereas a programming device according to one embodiment of the present invention may contain a user interface screen. The user interface may display information relating to a program, a program parameter or other information relating to the illumination device. The programmer may read information from the illumination apparatus and provide this information of the user interface screen.

A method of setting the address of a lighting system according to one embodiment of the present invention may include plugging the programming device into the lighting system. The programming device may also power the lighting system. Upon attachment of the programming device the lighting device may power up. A knob on the user interface of the programming device may be rotated to select a program, program parameter, or address mode. After the program has been selected, a parameter may then be selected and set. After the address mode has been selected, an address may be selected and set. The programming device may also automatically increment the address to provide quick setting of many lighting systems in an installation.

According to one embodiment, the lighting device can also be programmed to log the activities such as address setting, program selection, parameter setting or other settings. This may be useful in retrieving information at a later time. For example, many lighting devices have a unique identifier (e.g. a serial number) and this serial number could be retrieved along with the address settings and changes to the address setting. This information may be retrievable from a central computer operating the lighting network for example. This information could be used to locate the particular lighting device on the network by the serial number. This may be useful in the event the lighting device has to be changed for example.

According to one embodiment, when the lighting device is removed from the network, the central controller, or master controller, may be monitoring the network and realize the lighting device has been removed. When the next lighting device is attached to the system, at a similar location with respect to other lighting devices, the central system or master device may automatically set the address. Other information may also be retrieved from the lighting device such as date of manufacture, calibration information, color settings or other information. The lighting network may also use this information. For example, a network may retrieve information from a lighting device; subsequently the lighting device may malfunction and be replaced. The new lighting device may be of a newer version and as a result it may be much brighter than the original device. The network system could compare the information gathered from the original lighting device and compare it to the information gathered from the replacement device and then adjust the replacement device accordingly.

FIG. 1 illustrates a lighting system 100 according to one embodiment of the present invention. Lighting system 100 may include one or more LEDs 104A, 104B, and 104C. In an embodiment, the LEDs 104A, 104B, and 104C may produce different colors (e.g. 104A red, 104B green, and 104C blue). The lighting system 100 may also include a processor 102 wherein the processor 102 may independently control the output of the LEDs 104A, 104B, and 104C. The processor may generate control signals to run the LEDs such as pulse modulated signals, pulse width modulated signals (PWM), pulse amplitude modulated signals, analog control signals or other control signals to vary the output of the LEDs. In an embodiment, the processor may control other circuitry to control the output of the LEDs. The LEDs may be provided in strings of more than one LED that are controlled as a group and the processor 102 may control more than one string of LEDs. A person with ordinary skill in the art would appreciate that there are many systems and methods that could be used to operate the LED(s) and or LED string(s) and the present invention encompasses such systems and methods.

A lighting system 100 according to one embodiment of the present invention may generate a range of colors within a color spectrum. For example, the lighting system 100 may be provided with a plurality of LEDs (e.g. 104A–C) and the processor 102 may control the output of the LEDs such that the light from two or more of the LEDs combine to produce a mixed colored light. Such a lighting system may be used in a variety of applications including displays, room illumination, decorative illumination, special effects illumination, direct illumination, indirect illumination or any other application where it would be desirable. Many such lighting systems may be networked together to form large networked lighting applications.

In one embodiment, the LEDs 104 and or other components comprising alighting system 100 may be arranged in a housing 312. The housing 312 may be adapted to provide illumination to an area and may be arranged to provide linear lighting patterns, circular lighting patterns, rectangular, square or other lighting patterns within a space or environment. For example, a linear arrangement may be provided at the upper edge of a wall along the wall-ceiling interface and the light may be projected down the wall or along the ceiling to generate certain lighting effects. In another embodiment, the intensity of the generated light may be sufficient to provide a surface (e.g. a wall) with enough light that the lighting effects can be seen in general ambient lighting conditions. In an embodiment, such a housed lighting system may be used as a direct view lighting system. For example, such a housed lighting system may be mounted on the exterior of a building where an observer may view the lighted section of the lighting system directly. The housing may include diffusing, or other, optics such that the light from the LED(s) 104 is projected through the optics. This may aid in the mixing, redirecting or otherwise changing the light patters generated by the LEDs. The LED(s) 104 may be arranged within the housing 312, on the housing 312 or otherwise mounted as desired in the particular application.

The lighting system 100 may also include memory 114 wherein one or more lighting programs and or data may be stored. The lighting system 100 may also include a user interface 118 used to change and or select the lighting effects displayed by the lighting system 100. The communication between the user interface and the processor may be accomplished through wired or wireless transmission 112. The lighting system 100 may also be associated with a network 120 such that the lighting system 100 responds to network data. For example, the processor 102 may be an addressable processor that is associated with a network. Network data may be communicated through a wired or wireless network and the addressable processor may be 'listening' to the data stream for commands that pertain to it. Once the processor 'hears' data addressed to it, it may read the data and change the lighting conditions according to the received data. For example, the memory 114 in the lighting system 100 may be loaded with a table of lighting control signals that correspond with data the processor 102 receives. Once the processor 102 receives data from a network, user interface, or other source, the processor may select the control signals that correspond to the data and control the LED(s) accordingly. The received data may also initiate a lighting program to be executed by the processor 102 or modify a lighting program or control data or otherwise control the light output of the lighting system 100. In another embodiment, the processor 102 may be a non-networked processor. The microprocessor may be associated with memory 114 for example such that the processor executes a lighting program that was stored in memory.

The lighting system 100 may also include sensors and or transducers 122 and or other signal generators (collectively referred to hereinafter as sensors). The sensors may be associated with the processor 102 through wired or wireless transmission systems. Much like the user interface and network control systems, the sensor(s) may provide signals to the processor and the processor may respond by selecting new LED control signals from memory 114, modifying LED control signals, generating control signals, or otherwise change the output of the LED(s).

While the LEDs 104A, 104B, and 104C in FIG. 1 are indicated as red, green and blue, it should be understood that the LED(s) in a system according to the present invention might be any color including white, ultraviolet, infrared or other colors within the electromagnetic spectrum. As used herein, the term "LED" should be understood to include light emitting diodes of all types, light emitting polymers, semiconductor dies that produce light in response to current, organic LEDs, electro-luminescent strips, and other such systems. In an embodiment, an "LED" may refer to a single light emitting diode having multiple semiconductor dies that are individually controlled. It should also be understood that the term "LED" does not restrict the package type of the LED. The term "LED" includes packaged LEDs, non-packaged LEDs, surface mount LEDs, chip on board LEDs and LEDs of all other configurations. The term "LED" also includes LEDs packaged or associated with material (e.g. a phosphor) wherein the material may convert energy from the LED to a different wavelength.

An LED system is one type of illumination source. As used herein "illumination source" should be understood to include all illumination sources, including LED systems, as well as incandescent sources, including filament lamps, pyro-luminescent sources, such as flames, candle-luminescent sources, such as gas mantles and carbon arch radiation sources, as well as photo-luminescent sources, including gaseous discharges, fluorescent sources, phosphorescence sources, lasers, electro-luminescent sources, such as electro-luminescent lamps, light emitting diodes, and cathode luminescent sources using electronic satiation, as well as miscellaneous luminescent sources including galvano-luminescent sources, crystallo-luminescent sources, kine-luminescent sources, thermo-luminescent sources, triboluminescent sources, sonoluminescent sources, and radioluminescent sources. Illumination sources may also include luminescent polymers capable of producing primary colors.

The term "illuminate" should be understood to refer to the production of a frequency of radiation by an illumination source. The term "color" should be understood to refer to any frequency of radiation within a spectrum; that is, a "color," as used herein, should be understood to encompass frequencies not only of the visible spectrum, but also frequencies in the infrared and ultraviolet areas of the spectrum, and in other areas of the electromagnetic spectrum.

The lighting system 100 may also include a communication port 124 adapted to communicate with a programming device. The communication port may be adapted to receive and or transmit data through wired or wireless transmission. In an embodiment of the invention, information received through the communication port 124 may relate to address information and the lighting system 100 may be adapted to receive and then store the address information in the memory 114. The lighting system 100 may be adapted to use the stored address as its address for use when receiving data from network data. For example, the lighting system 100 may be connected to a network where network data is communicated. The lighting system may monitor the data communicated on the network and respond to data it 'hears' that correspond to the address stored in the lighting systems 100 memory 114. The memory 114 may be any type of memory including, but not limited to, non-volatile memory. A person skilled in the art would appreciate that there are many systems and methods for communicating to addressable lighting fixtures through networks (e.g. U.S. Pat. No. 6,016,038) and the present invention is not limited to a particular system or method.

In one embodiment, the lighting system 100 may be adapted to select a given lighting program, modify a parameter of a lighting program, or otherwise make a selection or modification or generate certain lighting control signals based on the data received from a programming device.

Figure 3:
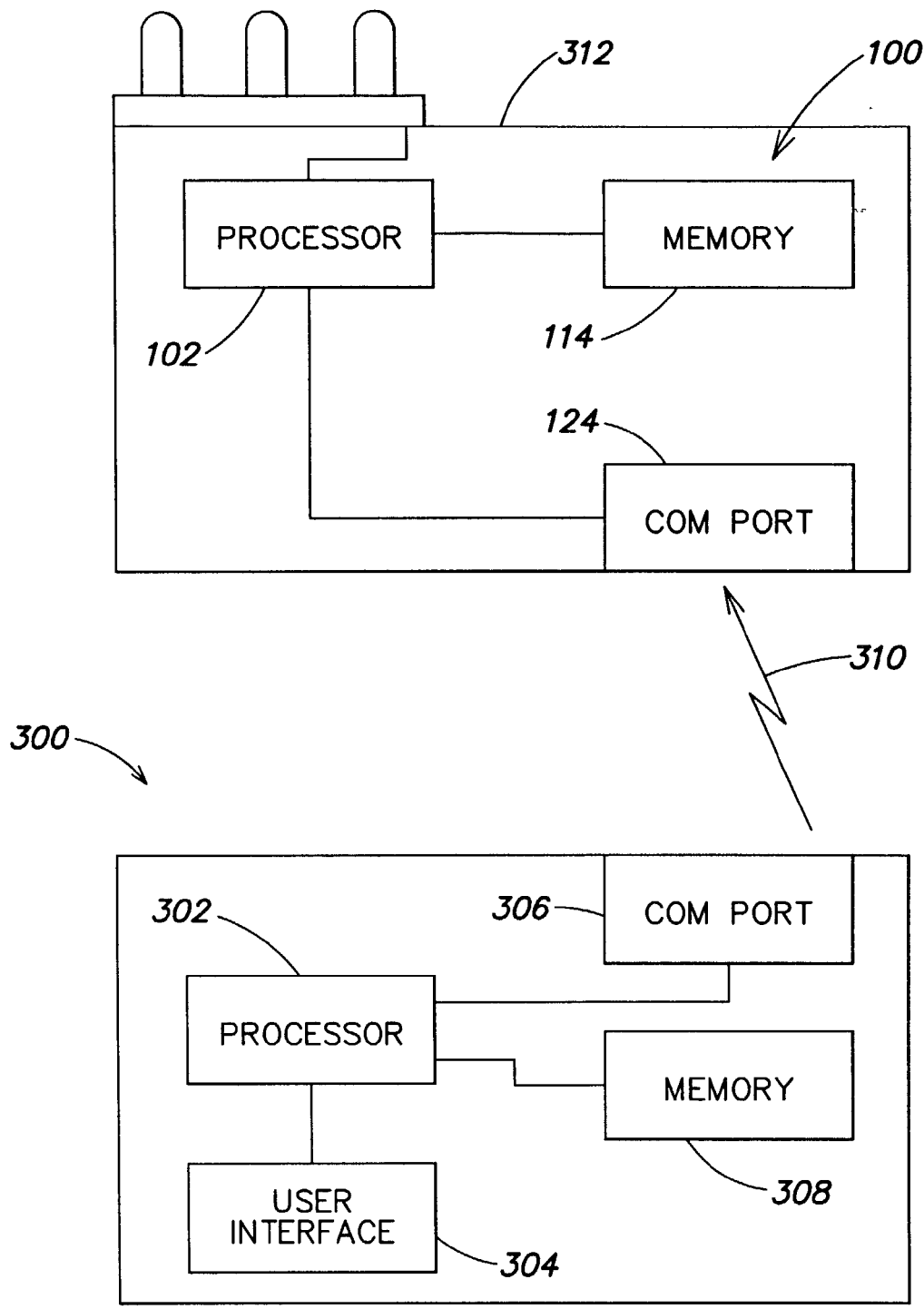
FIG. 3 illustrates a programming device and a lighting system according to one embodiment of the present invention.

FIG. 3 illustrates a programming device 300 in communicative association with a lighting system 100. The programming device 300 may include a processor 302, a user interface 304 associated with the processor 302, a communication port 306 in association with the processor 302, and memory 308 associated with the processor 302. The communication port 306 may be arranged to communicate a data signal 310 to and or from the lighting system 100 and the lighting system 100 may be adapted to receive and or transmit the data signal. For example, the communication port 306 may be arranged to communicate data via wired transmission and the communication port 124 of the lighting system 100 may be arranged to receive the wired transmission. Likewise, the communication ports may be arranged to communicate through wireless transmission.

The programming device processor 302 may be associated with a user interface 304 such that the user interface 304 can be used to generate an address in the processor 302. The user interface 304 may be used to communicate a signal to the processor and the processor may, in turn, generate an address and or select an address from the memory 308. In an embodiment, the user interface may be used to generate or select a starting address and the programming device may then be arranged to automatically generate the next address. For example, a user may select a new address by making a selection on the user interface and then the address may be communicated to a lighting system 100. Following the transmission of the address, a new address may be selected and or generated to be transmitted to the next lighting system 100. Of course the actual timing of the selection and or generation of the new address is not critical and may actually be generated prior to the transmission of the previous address or at any other appropriate time. This method of generating addresses may be useful in situations where the user wants to address more than one lighting systems 100. For example, the user may have a row of one hundred lighting systems 100 and may desire the first such lighting system include the address number one thousand. The user may select the address one thousand on the programming device and cause the programming device to communicate the address to the lighting system. Then the programming device may automatically generate the next address in the desired progression (e.g. one thousand one). This newly generated address (e.g. one thousand one) may then be communicated to the next lighting system in the row. This eliminates the repeated selection of the new addresses and automates one more step for the user. The addresses may be selected/generated in any desired pattern (e.g. incrementing by two, three, etc.).

The term "processor" should be understood to encompass all electrical circuits used to perform the desired function. For example, in an embodiment, the processor may be a microprocessor, specialized IC, computer chip or other platform where processing can be achieved. In an embodiment, the processor may be associated with memory such that the processor can execute a program that is stored in the memory. In another embodiment, the processor may comprise switch(es), register(s), shift register(s), converter(s) and the like to perform the required processing. For example, the processor may be a switch or plurality of switches. Once the programming device is communicatively associated with a lighting system, the switches may be opened and closed in a pattern to effectuate the desired communication. In an embodiment, the programming device may be intended to select a program, set an address or perform some other function. The programming device may be associated with the light and the processor in the programming device may close a switch and the light may recognize the switch was closed and then the light may make a selection based on the switch closure. These are just a few examples of how a processor may function in a system according to the principles of the present invention. It should be understood that there are many processors and processing methods that could be used in a system according to the present invention and such processors and methods are encompassed by the present invention.

The programming device may be arranged to store a selected/generated address in its memory to be recalled later for transmission to a lighting system. For example, a user may have a number of lighting systems to program and he may want to preprogram the memory of the programming device with a set of addresses because he knows in advance the lighting systems he is going to program. He may have a layout planned and it may be desirable to select an address, store it in memory, and then select a new address to be place in memory. This system of selecting and storing addresses could place a long string of addresses in memory. Then he could begin to transmit the address information to the lighting systems in the order in which he loaded the addresses.

The programming device 300 may include a user interface 304 and the user interface may be associated with the processor 302. The user interface 304 may be an interface, button, switch, dial, slider, encoder, analog to digital converter, digital to analog converter, digital signal generator, or other user interface. The user interface 304 may be capable of accepting address information, program information, lighting show information, or other information or signals used to control an illumination device. The device may communicate with a lighting device upon receipt of user interface information. The user interface information may also be stored in memory and be communicated from the memory to an illumination device. The user interface 304 may also contain a screen for the displaying of information. The screen may be a screen, LCD, plasma screen, backlit display, edgelit display, monochrome screen, color screen, screen, or any other type of display.

Figure 2:
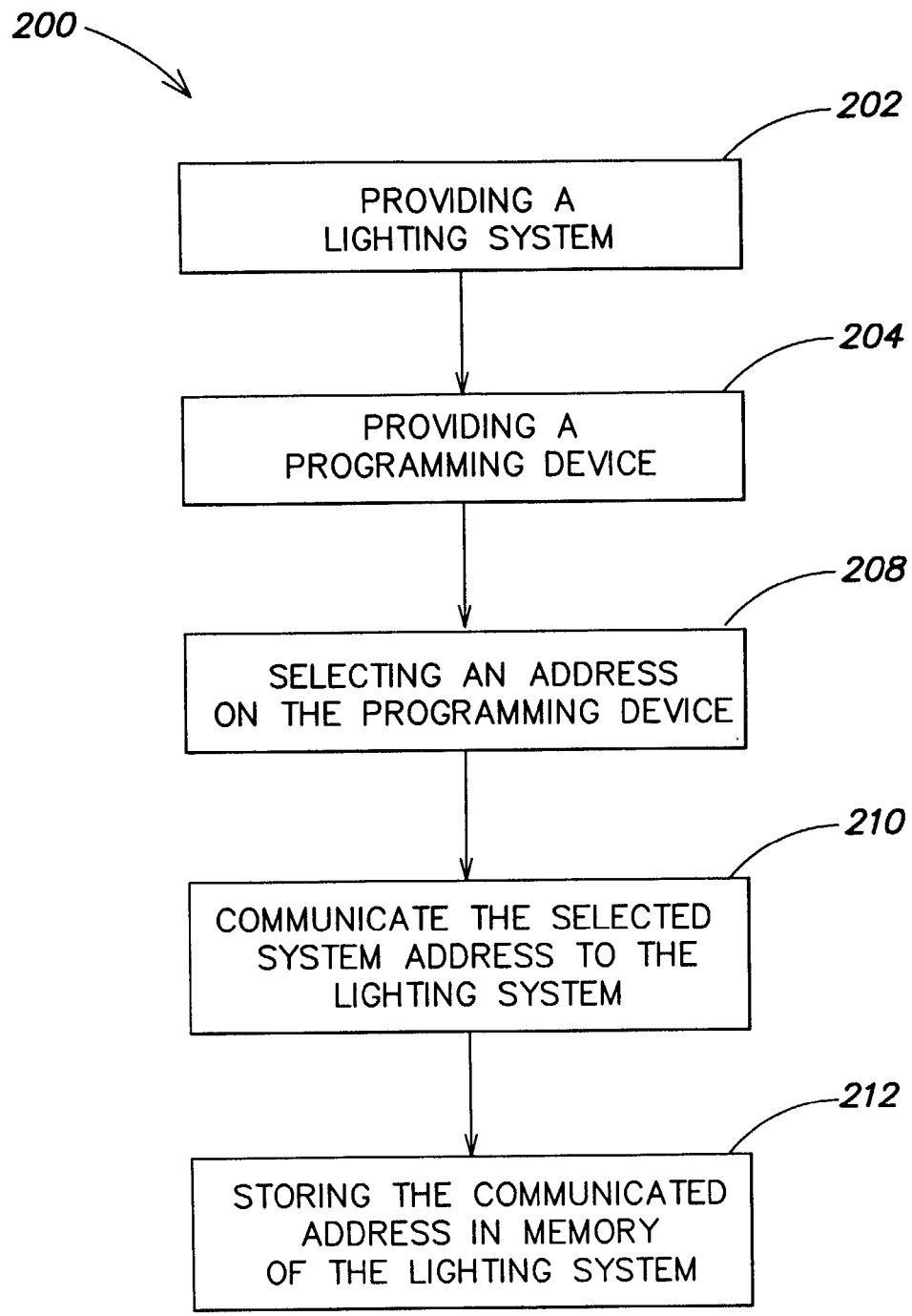
FIG. 2 illustrates a process flow diagram for programming a lighting device according to one embodiment of the present invention.

FIG. 2 illustrates a method for programming a lighting system 200 according to one embodiment of the present invention. The method may involve providing a lighting system 202, providing a programming device 204, selecting and or generating an address or other information on the programming device 208, communicating the selected and or generated address the lighting system 210, and storing the communicated address in the memory of the lighting system 212.

Although many of the examples contained herein use LED based lighting devices as the lighting system, other illumination sources may be incorporated into the lighting system. These illumination sources may be associated with addressable controllers that require setting when incorporated as a part of the network and or have preprogrammed lighting control programs to be selected, modified or generated. A programming device according to the principles of the present invention may be used to program the address, or perform other functions as described herein, in these illumination sources as well.

Many of the embodiments illustrated herein involve setting an address in a lighting system 100. However, a method or system according to the principles of the present invention may involve selecting a mode, setting, program or other setting in the lighting system 100. An embodiment may also involve the modification of a mode, setting, program or other setting in the lighting system 100. In an embodiment, a programming device 300 may be used to select a preprogrammed mode in the lighting system 100. For example, a user may select a mode using a programming device 300 and then communicate the selection to the lighting system 100 wherein the lighting system 100 would then select the corresponding mode. The programming device 300 may be preset with modes corresponding to the modes in the lighting system 100. For example, the lighting system 100 may have four preprogrammed modes: color wash, static red, static green, static blue, and random color generation. The programming device 300 may have the same four mode selections available such that the user can make the selection on the programming device 300 and then communicate the selection to the lighting system 100. Upon receipt of the selection, the lighting system 100 may select the corresponding mode from memory for execution by the processor 102. In an embodiment, the programming device may have a mode indicator stored in its memory such that the mode indicator indicates a particular mode or lighting program or the like. For example, the programming device may have a mode indicator stored in memory indicating the selection and communication of such a mode indicator would initiate or set a mode in the lighting system corresponding to the indicator. An embodiment of the present invention may involve using the programming device 300 to read the available selections from the lighting systems memory 114 and then present the available selections to the user. The user can then select the desired mode and communicate the selection back to the lighting system 100. In an embodiment, the lighting system may receive the selection and initiate execution of the corresponding mode.

In one embodiment, the programming device 300 may be used to download a lighting mode, program, setting or the like to a lighting system 100. The lighting system 100 may store the lighting mode in its memory 114. The lighting system 100 may be arranged to execute the mode upon download and or the mode may be available for selection at a later time. For example, the programming device 300 may have one or more lighting programs stored in its memory 308. A user may select one or more of the lighting programs on the programming device 300 and then cause the programming device 300 to download the selected program(s) to a lighting system 100. The lighting system 100 may then store the lighting program(s) in its memory 114. The lighting system 100 and or downloaded program(s) may be arranged such that the lighting system's processor 102 executes one of the downloaded programs automatically.

While many of the embodiments described herein pertain to controlling or setting parameters of individual lighting systems, the present invention also encompasses controlling or setting parameters of more than one or groups of lighting systems. For example, a lighting network may be comprised of strings of lighting systems. The individual lighting systems of the strings may be communicatively associated. A programming device according to the principles of the present invention may be used to communicate to one of the lighting systems in the string and the communication may be retransmitted or otherwise communicated to the other associated lighting systems. For example, a programming device may send a first lighting system an address. The communication may initiate the first lighting system to communicate information to another lighting system. Of course, the first lighting system may modify the transmission, pass through the transmission or otherwise communicate the information to the other lighting system. The may be useful where many lighting systems are associated and a user would like to communicate to more than one of them. The lighting systems may be arranged in a string of one hundred lighting systems and the user could use a programming device according to the principles of the present invention to communicate an address to the first, or other, lighting system. The first lighting system may store the address number one and the remaining lighting systems in the lighting string may be addressed sequentially or in some other pattern. In another embodiment, a lighting string may be associated with a control hub such that the hub can be sent information and the hub than sends information to its associated lighting system(s). Several hubs may be associated in a network. A programming device according to the principles of the present invention may be used to communicate to the hub or through the hub to the associated lighting systems.

As used herein, the terms "wired" transmission, reception, and or communication should be understood to encompass wire, cable, optical, or any other type of communication where the devices are physically connected. As used herein, the terms "wireless" transmission, reception, and or communication should be understood to encompass acoustical, RF, microwave, IR, and all other communication and or transmission systems were the devices are not physically connected.

All articles, patents, and other references set forth above are hereby incorporated by reference. While the invention has been disclosed in connection with the embodiments shown and described in detail, various equivalents, modifications, and improvements will be apparent to one of ordinary skill in the art from the above description. Such equivalents, modifications, and improvements are intended to be encompassed by the following claims.

What is claimed is:

1. A method for controlling an LED lighting system, comprising steps of:
    selecting at least one address via a user interface of a programming device;
    selecting at least one parameter of a lighting control program via the user interface, the at least one lighting control program for execution by the LED lighting system to generate a lighting routine;
    communicating the selected at least one address and the selected at least one parameter from the programming device to the LED lighting system;
    storing the at least one selected address and the at least one selected parameter in a memory in the LED lighting system; and
    using the at least one selected address to communicate a command to the LED lighting system to execute the lighting control program in accordance with the at least one selected parameter to generate a range of colors.

2. The method of claim 1 wherein the LED lighting system comprises at least two different colored LEDs.

3. The method of claim 2 wherein the LED lighting system includes a processor that controls at least one of the at least two different colored LEDs.

4. The method of claim 3 wherein the processor controls the at least one of the at least two different colored LEDs with a PWM signal.

5. The method of claim 3 wherein the processor controls the at least one of the at least two different colored LEDs with an analog signal.

6. The method of claim 1 wherein the step of communicating from the programming device to the LED lighting system is accomplished though wired transmission.

7. The method of claim 1 wherein the step of communicating from the programming device to the LED lighting system is accomplished though wireless transmission.

8. The method of claim 1 wherein the user interface is at least one of a dial, slider, switch, and button.

9. The method of claim 1 wherein the user interface further comprises a screen to display information.

10. The method of claim 9 wherein the screen further comprises at least one of an LCD, plasma display and LED display.

11. The method of claim 1 wherein the memory further comprises non-volatile memory.

12. The method of claim 1 further comprising:
    reading a unique identifier from the LED lighting system; and
    communicating the unique identifier and the at least one selected address to a central controller.

13. The method of claim 12 wherein the unique identifier comprises a serial number.

14. The method of claim 1 wherein the programming device further comprises a second memory.

15. The method of claim 14 wherein the step of selecting the at least one address further comprises a step of storing the selected address in the second memory.

16. The method of claim 1 wherein the step of selecting the at least one address comprises a step of automatically generating a new address at the programming device.

17. A method for controlling a system including a LED lighting system and a programming device, the programming device comprising a processor, a user interface associated with the processor adapted to receive user input, and a communication port associated with the processor and adapted to communicate with the LED lighting system, the method comprising steps of:

selecting an address on the programming device using the user interface;

selecting a parameter of a lighting control program for execution by the LED lighting system to generate a lighting routine;

communicating the selected address and the selected parameter from the programming device though the communication port; and using the selected address to communicate a command to the LED lighting system to execute the lighting control program in accordance with the selected parameter to generate a range of colors.

18. The method of claim 17 wherein the LED lighting system further comprises at least two different colored LEDs.

19. The method of claim 18 wherein the processor controls at least one of the at least two different colored LEDs.

20. The method of claim 19 wherein the processor controls the at least one of the at least two different colored LEDs with a PWM signal.

21. The method of claim 19 wherein the processor controls the at least one of the at least two different colored LEDs with an analog signal.

22. The method of claim 17 wherein the communication port is adapted to communicate wired transmissions.

23. The method of claim 17 wherein the communication port is adapted to communicate wireless transmissions.

24. The method of claim 17 wherein the user interface is at least one of a dial, slider, switch, and button.

25. The method of claim 17 wherein the user interface further comprises a screen to display information.

26. The method of claim 25 wherein the screen further comprises at least one of an LCD, plasma display and LED display.

27. The method of claim 17 wherein the programming device further comprises a memory wherein the memory is associated with the processor.

28. The method of claim 27 wherein the steps of selecting an address on the programming device and selecting a parameter further comprise storing the selected address and the selected parameter in the memory.

29. The method of claim 17 wherein the step of selecting an address on the programming device using the user interface comprises arranging the programming device to automatically generate a new address.

30. A method for controlling an LED lighting system, the LED lighting system comprising a memory, a processor associated with the memory, and a communication port associated with the processor adapted to communicate with a remote programming device, the method comprising steps of:

receiving via the communication port at least one address from the remote programming device; and receiving via the communication port a parameter of a lighting control program for execution by the LED lighting system lighting system to generate a lighting routine;

storing the received at least one address and the received parameter in the memory; and receiving a command to execute the lighting control program in accordance with the received parameter to generate a range of colors, the command directed to the at least one address.

31. The method of claim 30 wherein the LED lighting system further comprises at least two different colored LEDs.

32. The method of claim 31 wherein the processor controls at least one of the at least two different colored LEDs.

33. The method of claim 32 wherein the processor controls the at least one of the at least two different colored LEDs with a PWM signal.

34. The method of claim 32 wherein the processor controls the at least one of the at least two different colored LEDs with an analog signal.

35. The method of claim 30 wherein the communication port is adapted to receive wired transmission.

36. The method of claim 30 wherein the communication port is adapted to receive wireless transmission.

37. A system, comprising:

an LED lighting system comprising a memory and a processor associated with the memory;

a programming device comprising a second processor; and a user interface associated with the second processor and adapted to receive user input to select an address and to select a parameter of a lighting control program;

wherein the programming device is adapted to communicate the selected address and the selected parameter to the LED lighting system;

wherein the LED lighting system is adapted to receive the address and the parameter and to store the address and the parameter in the memory; and wherein the LED lighting system is adapted to execute the lighting control program in accordance with the parameter to generate a range of colors upon receipt of a command directed to the address.

38. The system of claim 37 wherein the LED lighting system further comprises at least two different colored LEDs.

39. The system of claim 38 wherein the processor controls at least one of the at least two different colored LEDs.

40. The system of claim 39 wherein the processor controls the at least one of the at least two different colored LEDs with a PWM signal.

41. The system of claim 39 wherein the processor controls the at least one of the at least two different colored LEDs with an analog signal.

42. The system of claim 37 wherein the programming device is adapted to communicate to the LED lighting system though wired transmission.

43. The system of claim 37 wherein the programming device is adapted to communicate to the LED lighting system though wireless transmission.

44. The system of claim 37 wherein the user interface is at least one of a dial, slider, switch, and button.

45. The system of claim 37 wherein the user interface further comprises a screen to display information.

46. The system of claim 45 wherein the screen further comprises at least one of an LCD, plasma display and LED display.

47. The system of claim 37 wherein the memory further comprises non-volatile memory.

48. The system of claim 37 wherein the processor is adapted to read a unique identifier from the LED lighting system.

49. The system of claim 48 wherein the unique identifier comprises a serial number.

50. The system of claim 37 wherein the programming device further comprises a second memory wherein the second memory is associated with the second processor.

51. The system of claim 50 wherein the second processor is adapted to store a selected address in the second memory.

52. The system of claim 37 wherein the second processor is adapted to automatically generate a new address.

53. A programming device, comprising:
a processor; and
a user interface associated with the processor adapted to receive user input to select an address and to select a parameter of a lighting control program,
wherein the programming device is adapted to communicate the selected address and the selected parameter from the programming device to an LED lighting system located remotely from the programming device; and
wherein the programming device is adapted to communicate a command to the LED lighting system to execute the lighting control program in accordance with the selected parameter to generate a range of colors, the command being directed to the selected address.

54. The device of claim 53 wherein the LED lighting system further comprises at least two different colored LEDs.

55. The device of claim 54 wherein the processor controls at least one of the at least two different colored LEDs.

56. The device of claim 55 wherein the processor controls the at least one of the at least two different colored LEDs with a PWM signal.

57. The device of claim 55 wherein the processor controls the at least one of the at least two different colored LEDs with an analog signal.

58. The device of claim 53 wherein the programming device is adapted to communicate from the programming device to the LED lighting system though wired transmission.

59. The device of claim 53 wherein the programming device is adapted to communicate from the programming device to the LED lighting system though wireless transmission.

60. The device of claim 53 wherein the user interface is at least one of a dial, slider, switch, and button.

61. The device of claim 53 wherein the user interface further comprises a screen to display information.

62. The device of claim 61 wherein the screen further comprises at least one of an LCD, plasma display and LED display.

63. The device of claim 53 wherein the programming device further comprises a memory wherein the memory is associated with the processor.

64. The device of claim 63 wherein the programming device is further adapted to store the selected address in the memory.

65. The system of claim 53 wherein the processor is adapted to automatically generate a new address.

66. An LED lighting system, comprising:
a memory and a processor associated with the memory;
wherein the LED lighting system is adapted to receive an address and a parameter for a lighting control program from a remote programming device and to store the received address and the received parameter in the memory; and wherein the LED lighting system is adapted to execute the lighting control program according to the received parameter to generate a range of colors upon receipt of a command from the remote programming device directed to the received address.

67. The system of claim 66 wherein the LED lighting system further comprises at least two different colored LEDs.

68. The system of claim 67 wherein the processor controls at least one of the at least two different colored LEDs.

69. The system of claim 68 wherein the processor controls the at least one of the at least two different colored LEDs with a PWM signal.

70. The system of claim 68 wherein the processor controls the at least one of the at least two different colored LEDs with an analog signal.

71. The system of claim 66 wherein the LED lighting system is adapted to receive an address and a parameter from a remote programming device though wired transmission.

72. The system of claim 66 wherein the LED lighting system is adapted to receive an address and a parameter from a remote programming device though wireless transmission.

* * * * *

UNITED STATES PATENT AND TRADEMARK OFFICE
CERTIFICATE OF CORRECTION

| | | |
|---|---|---|
| PATENT NO. | : 7,161,556 B2 | |
| APPLICATION NO. | : 10/078221 | |
| DATED | : January 9, 2007 | |
| INVENTOR(S) | : Frederick M. Morgan et al. | |

It is certified that error appears in the above-identified patent and that said Letters Patent is hereby corrected as shown below:

In the Claims should read

30. A method for controlling an LED lighting system, the LED lighting system comprising a memory, a processor associated with the memory, and a communication port associated with the processor adapted to communicate with a remote programming device, the method comprising steps of:
 receiving via the communication port at least one address from the remote programming device; and
 receiving via the communication port a parameter of a lighting control program for execution by the LED lighting system to generate a lighting routine;
 storing the received at least one address and the received parameter in the memory; and
 receiving a command to execute the lighting control program in accordance with the received parameter to generate a range of colors, the command directed to the at least one address.

Signed and Sealed this

Twentieth Day of March, 2007

JON W. DUDAS
*Director of the United States Patent and Trademark Office*